US011711266B2

(12) United States Patent
JeevaRaj et al.

(10) Patent No.: US 11,711,266 B2
(45) Date of Patent: *Jul. 25, 2023

(54) DEPLOYING A NETWORK MANAGEMENT CONTROLLER IN AN EXISTING DATA CENTER FABRIC

(71) Applicant: Juniper Networks, Inc., Sunnyvale, CA (US)

(72) Inventors: Sridevi JeevaRaj, San Jose, CA (US); Suresh Palguna Krishnan, Fremont, CA (US); Ganesha Hebbale Venkatasubbaiah, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,799

(22) Filed: Jul. 20, 2022

(65) Prior Publication Data

US 2022/0368591 A1 Nov. 17, 2022

Related U.S. Application Data

(63) Continuation of application No. 17/249,760, filed on Mar. 11, 2021, now Pat. No. 11,431,567.

(51) Int. Cl.
*G06F 15/177* (2006.01)
*H04L 41/0816* (2022.01)
(Continued)

(52) U.S. Cl.
CPC ...... *H04L 41/0816* (2013.01); *H04L 41/0853* (2013.01); *H04L 41/0883* (2013.01); *H04L 41/22* (2013.01)

(58) Field of Classification Search
CPC ............. H04L 41/0816; H04L 41/0853; H04L 41/0883; H04L 41/22
(Continued)

(56) References Cited

U.S. PATENT DOCUMENTS 6,389,464 B1 * 5/2002 Krishnamurthy ... H04L 41/0253
709/221
7,710,900 B2 * 5/2010 Andrews ................. H04L 45/00
370/254
(Continued)

FOREIGN PATENT DOCUMENTS

EP 3672157 A1 6/2020

OTHER PUBLICATIONS

Extended Search Report from counterpart European Application No. 21177640.6 dated Nov. 19, 2021, 11 p.
(Continued)

*Primary Examiner* — Alicia Baturay
(74) *Attorney, Agent, or Firm* — Shumaker & Sieffert, P.A.

(57) ABSTRACT

Some organizations have a deployed and functional "controllerless" EVPN VxLAN Fabric in their data centers. Eventually, however, the organization may deploy a controller within the network. In one example, this disclosure describes a method that includes configuring a controller to communicate with each of a plurality of elements in a network; determining, by the controller, an initial operational state of the network; translating, by the controller, the initial operational state of the network to an intent-based configuration; pushing, by the controller, the intent-based configuration to the network to reconfigure each of the plurality of elements in the network in a manner consistent with the intent-based configuration; determining, by the controller and after pushing the intent-based configuration, an updated operational state of the network; and comparing, by the controller, the initial operational state of the network with the updated operational state of the network.

20 Claims, 5 Drawing Sheets

(51) Int. Cl.
*H04L 41/0853* (2022.01)
*H04L 41/08* (2022.01)
*H04L 41/22* (2022.01)

(58) Field of Classification Search
USPC .......................................................... 709/220
See application file for complete search history.

(56) References Cited

U.S. PATENT DOCUMENTS

| | | | | |
|---|---|---|---|---|
| 7,995,498 | B2* | 8/2011 | Andrews | H04L 41/0886 370/254 |
| 10,103,902 | B1* | 10/2018 | Sampath | H04L 12/66 |
| 10,530,697 | B2* | 1/2020 | Fourie | H04L 41/0806 |
| 10,673,736 | B2* | 6/2020 | Srinivasan | H04L 61/103 |
| 10,691,337 | B2* | 6/2020 | Pasupathy | G06N 20/00 |
| 10,742,501 | B1 | 8/2020 | Pianigiani et al. | |
| 10,897,395 | B2* | 1/2021 | A | H04L 41/0813 |
| 10,924,392 | B2* | 2/2021 | Shenoy | H04L 45/64 |
| 10,985,997 | B2* | 4/2021 | Duggal | H04L 41/5019 |
| 10,992,543 | B1* | 4/2021 | Rachamadugu | H04L 43/04 |
| 10,996,938 | B2* | 5/2021 | Tulsian | H04L 41/0897 |
| 11,025,489 | B2* | 6/2021 | Leijon | H04L 41/0816 |
| 11,088,919 | B1* | 8/2021 | Chandrashekhar | H04L 63/0209 |
| 11,113,120 | B1* | 9/2021 | Greenfield | G06F 9/4881 |
| 11,431,567 | B1* | 8/2022 | JeevaRaj | H04L 41/0883 |

OTHER PUBLICATIONS

Prosecution History from U.S. Appl. No. 17/249,760, dated May 24, 2021 through Jul. 15, 2022, 181 pp.

U.S. Appl. No. 17/249,760, filed Mar. 11, 2021, naming inventors JeevaRaj et al.

Response to Extended Search Report dated Nov. 19, 2021, from counterpart European Application No. 21177640.6 filed Mar. 8, 2023, 23 pp.

Communication pursuant to Article 94(3) EPC from counterpart European Application No. 21177640.6 dated May 3, 2023, 7 pp.

* cited by examiner

DEPLOYING A NETWORK MANAGEMENT CONTROLLER IN AN EXISTING DATA CENTER FABRIC

This application is a continuation of U.S. patent application Ser. No. 17/249,760, filed 11 Mar. 2021, the entire contents of which is incorporated herein by reference.

TECHNICAL FIELD

This disclosure relates to computer networks, and more specifically, to use of a network management controller in a data center fabric.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

Network devices typically include mechanisms, such as management interfaces, enabling local or remote configuration. By interacting with the management interface, a client device can perform configuration tasks as well as perform operational commands to collect and view operational data of the managed devices. For example, client devices may configure interface cards of the managed device, adjust parameters for supported network protocols, specify physical components within the managed device, modify routing information maintained by a router, access software modules and other resources residing on the managed device, and perform other configuration tasks. In addition, client devices may allow a user to view current operating parameters, system logs, information related to network connectivity, network activity or other status information from the devices as well as view and react to event information received from the devices.

Often, software defined networks include a fabric management tool or controller. Such a controller can be used to manage a network fabric and enable resources to be virtualized, new environments to be deployed, and existing environments to be decommissioned. However, not all networks use a controller.

SUMMARY

Some organizations have a deployed and functional "controllerless" Ethernet Virtual Private Network (EVPN) Virtual Extensible LAN (VxLAN) fabric in their data centers. VXLAN is an encapsulation protocol that provides data center connectivity using tunneling to stretch Layer 2 connections over an underlying Layer 3 network. Eventually, however, growth of the network, complexity, or other considerations may motivate an organization to deploy a controller within the network. When there is a need to migrate an existing controllerless network fabric to controller-based management, the IP fabric of the existing network is typically absorbed (e.g., imported) and managed by the controller. However, absorbing certain configurations of the existing network, such as the underlay and overlay configurations of the network, is often difficult. In particular, absorbing the underlay (e.g., eBGP) and the overlay (e.g., EVPN VxLAN) can be difficult to do, at least if it requires reverse-engineering individual device configurations.

In addition, a network that is originally deployed without a controller is likely to have been deployed for a significant period of time before a need for a controller is identified. At that point, there may be many thousands of lines of configurations on the switches. Absorbing the underlay and overlay by reverse-engineering individual device configurations might require parsing a significant number of configurations and permutation combinations, and correctly capturing each of the pertinent parameters and fields can be challenging. It may be possible to handle the translation process through external scripts that read device configurations, but even if possible, such a solution would be difficult to implement and/or maintain.

In accordance with one or more techniques described herein, and rather than dealing directly with each specific network device configuration setting, a fabric management tool or controller may determine an intent-based configuration of the existing controllerless network. The intent-based configuration of the network may be determined based on information about the operational state of the network. To determine the operational sate of the network, a fabric management tool or controller may issue to the network various queries and/or commands. The queries or commands are chosen such that the responses to the queries or commands tend to identify the operational state of the network. The fabric management tool or controller translates the responses into an operational state and then into an intent-based configuration.

Once an intent-based configuration is captured, the intent-based configuration may be pushed back out to the network to transition or migrate the existing network to a controller-managed network, thereby reconfiguring devices or elements within the existing network in a manner consistent with the intent-based configuration. In some examples, once the network is migrated to the new intent-based configuration, the migrated configuration can be verified by comparing the operational state of the migrated network to the operational state of the network prior to the migration.

In some examples, this disclosure describes operations performed by a fabric management tool, controller, or other network device in accordance with one or more aspects of this disclosure. In one specific example, this disclosure describes a method comprising configuring a controller to communicate with each of a plurality of elements in a network; determining, by the controller, an initial operational state of the network; translating, by the controller, the initial operational state of the network to an intent-based configuration; pushing, by the controller, the intent-based configuration to the network to reconfigure each of the plurality of elements in the network in a manner consistent with the intent-based configuration; determining, by the controller and after pushing the intent-based configuration, an updated operational state of the network; and comparing, by the controller, the initial operational state of the network with the updated operational state of the network.

In another example, this disclosure describes a system comprising a storage system and processing circuitry, wherein the processing circuitry has access to the storage system and is configured to: enable communication with each of a plurality of elements in a network; determine an initial operational state of the network; translate the initial operational state of the network to an intent-based configuration; push the intent-based configuration to the network to reconfigure each of the plurality of elements in the network in a manner consistent with the intent-based configuration; determine, after pushing the intent-based configuration, an updated operational state of the network; and compare the initial operational state of the network with the updated operational state of the network.

In another example, this disclosure describes a computer-readable storage medium comprising instructions that, when executed, configure processing circuitry of a computing system to enable communication with each of a plurality of elements in a network; determine an initial operational state of the network; translate the initial operational state of the network to an intent-based configuration; push the intent-based configuration to the network to reconfigure each of the plurality of elements in the network in a manner consistent with the intent-based configuration; determine, after pushing the intent-based configuration, an updated operational state of the network; and compare the initial operational state of the network with the updated operational state of the network.

DETAILED DESCRIPTION

Figure 1A:
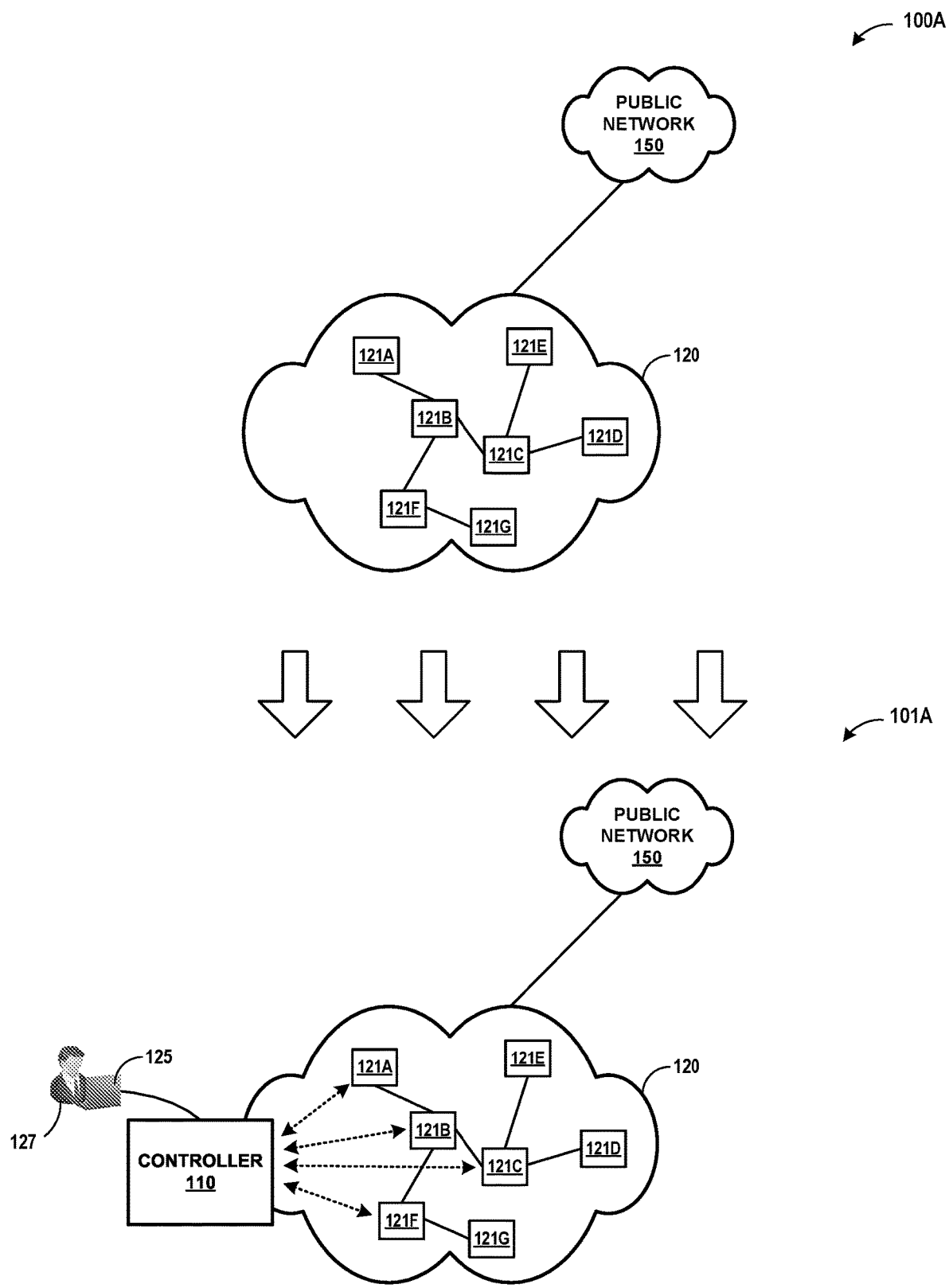
FIG. 1A is a conceptual diagram illustrating a controller-less network system being transitioned to a managed network system using a fabric management tool or controller, in accordance with one or more aspects of the present disclosure.

FIG. 1A is a conceptual diagram illustrating a controller-less network system being transitioned to a managed network system using a fabric management tool or controller, in accordance with one or more aspects of the present disclosure. In the example shown in FIG. 1A, network system 100A is migrated into managed network system 101A. Both network system 100A and managed network system 101A include fabric 120 and public network 150, and in each case, fabric 120 includes network elements 121A through 121G (collectively "elements 121" and representing any number of network elements). In managed network system 101A, however, controller 110 is deployed within fabric 120 to manage fabric 120, thereby enabling controller 110 to manage aspects of not just fabric 120 but aspects of each of elements 121 within fabric 120 (e.g., dotted lines with arrows between controller 110 and some of elements 121 represent control and/or management). In some examples, one or more administrators 127 may interact directly with controller 110, or in other examples, such administrators 127 may interact with controller 110 through one or more client devices or administrator devices 125.

As shown in FIG. 1A, elements 121 of fabric 120 include network devices interconnected via communication links to form a communication topology in order to exchange resources and information. Elements 121 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described herein as transmitting, conveying, or otherwise supporting packets, fabric 120 may transmit data according to any other discrete data unit defined by any other protocol. Communication links interconnecting elements 121 may be physical links (e.g., optical, copper, and the like), wireless, or any combination thereof.

Fabric 120 is shown coupled to public network 150 (e.g., the internet) via a communication link. Public network 150 may include, for example, one or more client computing devices. Public network 150 may provide access to web servers, application servers, public databases, media servers, end-user devices, and other types of network resource devices and content.

In managed network system 101A, controller 110 is communicatively coupled to elements 121 via fabric 120. Controller 110, in some examples, is or forms part of a device management system or fabric management tool. For ease of illustration, one such controller 110 is shown in FIG. 1A, although controller 110 may have multiple instances and/or span multiple devices or systems. Controller 110 may be coupled either directly or indirectly to the various elements 121. Once controller 110 is deployed within fabric 120 (see managed network system 101A), one or more administrators 127 may use controller 110 (or multiple such management devices) to manage elements 121 using a device management protocol. One example device protocol is the Simple Network Management Protocol (SNMP) that allows controller 110 to traverse and modify management information bases (MIBs) that store configuration data within each of managed elements 121.

In common practice, controller 110 (which may also be referred to as a fabric management tool or a network management system) and elements 121 are centrally maintained by an IT group of an enterprise associated with fabric 120. Once controller 110 is configured and is managing fabric 120, one or more of administrators 127 may interact with controller 110 to remotely monitor and configure elements 121. For example, one or more administrators 127 may receive alerts from controller 110 regarding any of elements 121, view configuration data associated with elements 121, modify the configurations data of elements 121, add new network devices to fabric 120, remove existing network devices from fabric 120, or otherwise manipulate fabric 120 and network devices therein. Although described primarily in the context of an enterprise network, techniques of this disclosure are applicable to other network types, public and private, including LANs, VLANs, VPNs, and the like.

Once controller 110 is managing fabric 120 (see managed network system 101A), one or more administrators 127 may use one or more administrator devices 125 to interact with controller 110 and/or with elements 121 through various means, such as through telnet, secure shell (SSH), or other such communication sessions. That is, elements 121 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, administrator 127 may initiate an SSH session with one of elements 121, e.g., element 121F, using controller 110 to directly configure element 121F. In this manner, administrator 127 may provide commands in a format for execution directly to element 121F.

Further, one or more administrators 127 may also create scripts that can be submitted by controller 110 to any or all of elements 121 within fabric 120. For example, in addition to a CLI interface, elements 121 also provide interfaces for receiving scripts that specify the commands in accordance with a scripting language. In a sense, the scripts may be output by controller 110 to automatically invoke corresponding remote procedure calls (RPCs) on managed elements 121. The scripts may conform to, e.g., extensible markup language (XML) or another data description language.

Administrators 127 use controller 110 to configure elements 121 to specify certain operational characteristics that further the objectives of administrators 127. For example, administrators 127 may specify for a specific element 121 a particular operational policy regarding security, device accessibility, traffic engineering, quality of service (QoS), network address translation (NAT), packet filtering, packet forwarding, rate limiting, or other policies. Controller 110 uses one or more network management protocols designed for management of configuration data within managed elements 121 of managed network system 101A to perform the configuration. Such management protocols may include the SNMP protocol or the Network Configuration Protocol (NETCONF) protocol or a derivative thereof, or the Juniper Device Management Interface.

FIG. 1A might represent a situation in which an organization's network (i.e., network system 100A) has become sufficiently large and/or complicated such that management of fabric 120 by a fabric management tool is desired by the organization. In such a situation, an organization might conclude that use of a controller (i.e., controller 110) within fabric 120 could simply aspects of how fabric 120 is managed. Accordingly, network system 100A and managed network system 101B might each represent the enterprise network managed by an organization, before and after the migration. The migration illustrated in FIG. 1A may therefore correspond to the organization transitioning network system 100A to managed network system 101A by deploying controller 110 into the organization's existing enterprise network (i.e., a "brownfield deployment" of controller 110). Deploying controller 110 into a newly-established network (e.g., a "greenfield deployment" scenario) tends to be easier, because the fabric management tool can be used to configure the network. However, deploying controller 110 into an existing controllerless data center fabric 120, as in FIG. 1A, often requires a different approach. For example, an existing controllerless data center fabric (represented by network system 100A) can be expected to have been deployed for a significant amount of time before a need for a controller is identified. Further, such a network would normally have grown significantly beyond a simple topology and beyond a small number of configurations on switches and other network devices within the network. Accordingly, transitioning network system 100A to managed network system 101A can be complicated, and absorbing certain aspects of the existing network configurations (e.g., the underlay and overlay configurations) by reading and translating individual device configurations on each of elements 121 is often not trivial.

In accordance with one or more techniques described herein, and rather than directly engaging in the potentially difficult and non-trivial process reconfiguring each specific network device configuration setting within fabric 120, controller 110 may determine an intent-based configuration of the network. Once the intent-based configuration is determined, controller 110 may then manage fabric 120 based on that intent-based configuration. In some examples, controller 110 serves as a network management system (NMS) device that may configure business policies, or simply "policies" within fabric 120. In particular, user configuration of devices may be referred to as "intents." Intents may be represented as intent models, which may be modeled using a data structure, for example, such as, but not limited to, a unified graph model.

User intents can be categorized as business intents or stateless intents. Business intents, or stateful intents, may be resolved based on the current state of a network. Business intents may include, for example, a data throughput. Stateless intents may be fully declarative ways of describing an intended network/compute/storage state, without concern for a current network state. Stateless intents may include, for example, a virtual private network (VPN) connection between two devices. Application workflows may translate business intents into stateless intents. Controller devices support user intents, such that an administrator can describe the intended state of the network.

To determine the intent-based configuration of fabric 120, controller 110 is inserted into fabric 120 as shown in FIG. 1A. In some examples, this may involve one or more administrators 127 physically connecting controller 110 to fabric 120, so that fabric 120 has a topology corresponding to managed network system 101A of FIG. 1A. Controller 210 may be physically connected to fabric 120 through ports of various network devices, switches, and/or routers within fabric 320.

Once connected, controller 110 may collect information about the operational state of fabric 120. For instance, in an example that can be described in the context of FIG. 1A, controller 110 outputs operational commands to each of elements 121. Each of elements 121 responds to such operational commands. Controller 110 evaluates information received in the responses from each of elements 121 to determine an operational state of fabric 120. In some examples, the commands that controller 110 issues to some or all of elements 121 are chosen to elicit underlay and overlay information.

Controller 110 may translate the collected information into an intent-based configuration. For instance, continuing with the example being described with reference to FIG. 1A, controller 110 parses the responses to the operational commands. Controller 110 identifies information in the response fields that are of value and importance. Typically, the identified information relates to the parameters that are needed to create relevant and corresponding database objects in the controller (or other fabric manager software). The controller, as described herein, then converts the relevant database objects into an intent-based configuration describing the network. Accordingly, by using information elicited through operational commands or queries issued to devices within an existing network, it may be possible to convert raw device configurations into intent-based configurations.

In the example being described, controller 110 collects information about the operational state of an existing network (i.e., fabric 120) as part of a brownfield migration of fabric 120 from network system 100A to managed network system 101A. However, such a brownfield migration may in some respects be similar to a greenfield deployment scenario (e.g., where a new network is managed from inception by controller 110). In a greenfield scenario, controller 110 has a certain set of tasks that it performs when starting to manage a new fabric, and those tasks are typically performed when configuring any new network. Such tasks may involve making various configurations of one or more elements 121. In a brownfield scenario, however, controller 110 may perform that same set of tasks when absorbing an existing fabric. However, rather than making initial configurations of those same elements 121, controller 110 may instead, in a brownfield deployment, query the existing elements 121 to identify their operational state and create a database object that corresponds to each existing element 121. Accordingly, the set of tasks that controller 110 may perform in a greenfield scenario may correspondingly be performed in a brownfield scenario.

Once controller 110 determines the intent-based configuration of fabric 120, controller 110 may push the intent-based configuration back to the network. For instance, again referring to the example being described in the context of FIG. 1A, controller 110 uses the database objects representing the intent-based configuration of fabric 120 to output various configuration commands. Each of elements 121 detect such commands and perform the appropriate configurations. Once configured, fabric 120 should have an operational state that represents the intent-based configuration represented by the database objects.

Controller 110 may verify the intent-based configuration. For instance, after pushing the intent-based configuration to fabric 120, controller 110 again outputs operational commands to each of elements 121. Each of elements 121 respond to such operational commands, and using such responses, controller 110 determines an updated, or new operational state. Controller 110 compares the updated operational state with the initial operational state of fabric 120. If the operational state match sufficiently, controller 110 determines that the new configuration is verified.

Once the intent is captured in a database, the devices on a network can be completely managed by the fabric tool or controller. In some situations, it may be important for controller 110 to have complete device management control over fabric 120 and elements 121 within 120, because this would ensure device restoration in the event of a failure. Controller 110 may, at any time, use the intent-based configuration to restore any of elements 121 back to its original state, should such an operation be necessary for maintenance, debugging, or other purposes.

Figure 1B:
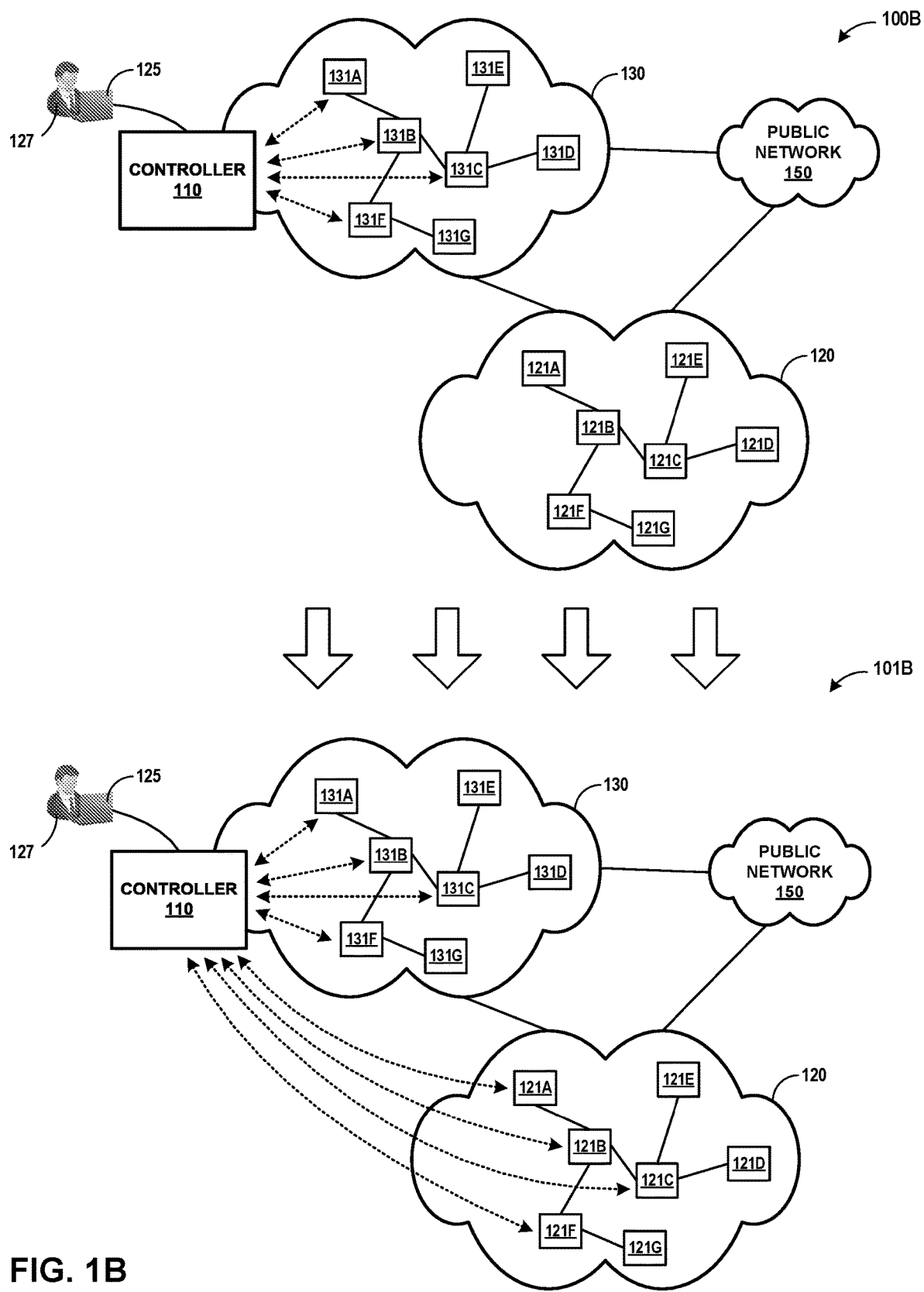
FIG. 1B is a conceptual diagram illustrating a partially-managed network system being transitioned to being fully managed by a fabric management tool or controller, in accordance with one or more aspects of the present disclosure.

FIG. 1B is a conceptual diagram illustrating a partially-managed network system being transitioned to being fully managed by a fabric management tool or controller, in accordance with one or more aspects of the present disclosure. FIG. 1B is similar to FIG. 1A, in that both network system 100B and managed network system 101B include fabric 120 and public network 150, and in each case, fabric 120 includes elements 121A through 121G (collectively "elements 121"). However, network system 100B and managed network system 101B of FIG. 1B each also include fabric 130, which includes elements 131A through 131G (collectively "elements 131" and representing any number of elements).

Both network system 100B and managed network system 101B also include controller 110. Initially, within network system 100B, fabric 130 is managed by controller 110 but fabric 120 is not managed by controller 110. In managed network system 101B (after the transition), both fabric 130 and fabric 120 are managed by controller 110. As in FIG. 1A, administrator 127 may interact with controller 110 directly or through administrator device 125.

FIG. 1B might represent a situation in which a portion of an enterprise network is managed by a fabric management tool (e.g., controller 110), but some portion of the enterprise network is not managed by the fabric management tool. In the example of FIG. 1B, fabric 120 might be considered a controllerless portion of network system 100A that is being transitioned to being managed by controller 110. Such a situation might arise when an organization seeks to deploy an existing fabric management tool to additional parts of an enterprise network. Accordingly, in FIG. 1B, controller 110 is already part of the enterprise network but is migrated across previously-unmanaged portions of the enterprise network (e.g., fabric 120), thereby representing a brownfield deployment of controller 110 into existing fabric 120.

In accordance with one or more aspects of the present disclosure, controller 110 may expand its management of fabric 130 to encompass fabric 120. For instance, in an example that can be described with reference to FIG. 1B, controller 110 is already physically connected to fabric 130, and may be configured so that it has access to fabric 120. Once fabric 120 is accessible to controller 110, controller 110 collects information about the operational state of fabric 120. To do to, controller 110 outputs operational commands to each of elements 121. Each of elements 121 responds to such operational commands. Controller 110 evaluates information received in the responses from each of elements 121 to determine an operational state of fabric 120, including underlay and overlay information. Controller 110 translates the operational state of fabric 120 into an intent-based configuration, in a manner similar to that described in connection with FIG. 1A.

Controller 110 may push the intent-based configuration back to fabric 120. For instance, again referring to the example being described in the context of FIG. 1B, controller 110 uses the intent-based configuration determined from the initial operational state of fabric 120 to output various configuration commands. Each of elements 121 detect such commands and perform the appropriate configurations, thereby transforming fabric 120 into the intent-based configuration pushed by controller 110.

As in FIG. 1A, controller 110 may verify the intent-based configuration in FIG. 1B. For instance, after pushing the intent-based configuration to fabric 120, controller 110 again outputs operational commands to each of elements 121 to determine an updated operational state. Controller 110 compares the updated operational state of fabric 120 (e.g., in managed network system 101B) with the initial operational state of fabric 120 (e.g., in network system 100B). Controller 110 determines whether the new configuration is verified based on the comparison.

The techniques described herein may provide certain technical advantages. By collecting information about the operational state of an existing controllerless network (e.g., fabric 120) and using that information to determine an intent-based configuration of the network, a significantly easier and more reliable process for discovering underlay and overlay configurations is possible. Such a solution is not only easier than attempting to reverse engineer or translate individual network device configurations, but such a solution is scalable, at least because it relies less on device-dependent individual device configurations, and more on device-independent operational state. Commands to determine the operational state of a network or network device tend to be more device-independent, and less dependent upon the platform, hardware, vendor, and/or device family.

For example, the data model of the XML, outputs for operational state commands tends to be consistent across platforms, meaning that outputs for a given operational state query can be used to parse the desired values for different platforms. Accordingly, little or no software change or maintenance procedures are needed to incorporate any platform, model, or network device family that might be encountered in a brownfield migration. The proposed solution might therefore be adopted by any fabric management tool or controller.

Further, by determining an intent-based configuration, and reconfiguring network devices based on the intent-based configuration, unnecessary configurations are often removed, thereby eliminating certain legacy configurations that might otherwise persist in the device with no productive use. Accordingly, using the operational state model for brownfield discovery will enable an administrator to clean up configurations during migration. Further, pushing the intent-base configuration that is based on the determined operational state enables confirmation that the operational state has not changed during migration. Performing such a confirmation may simply involve reading the post-migration operational state and comparing the state to the pre-migration operational state.

Figure 2:
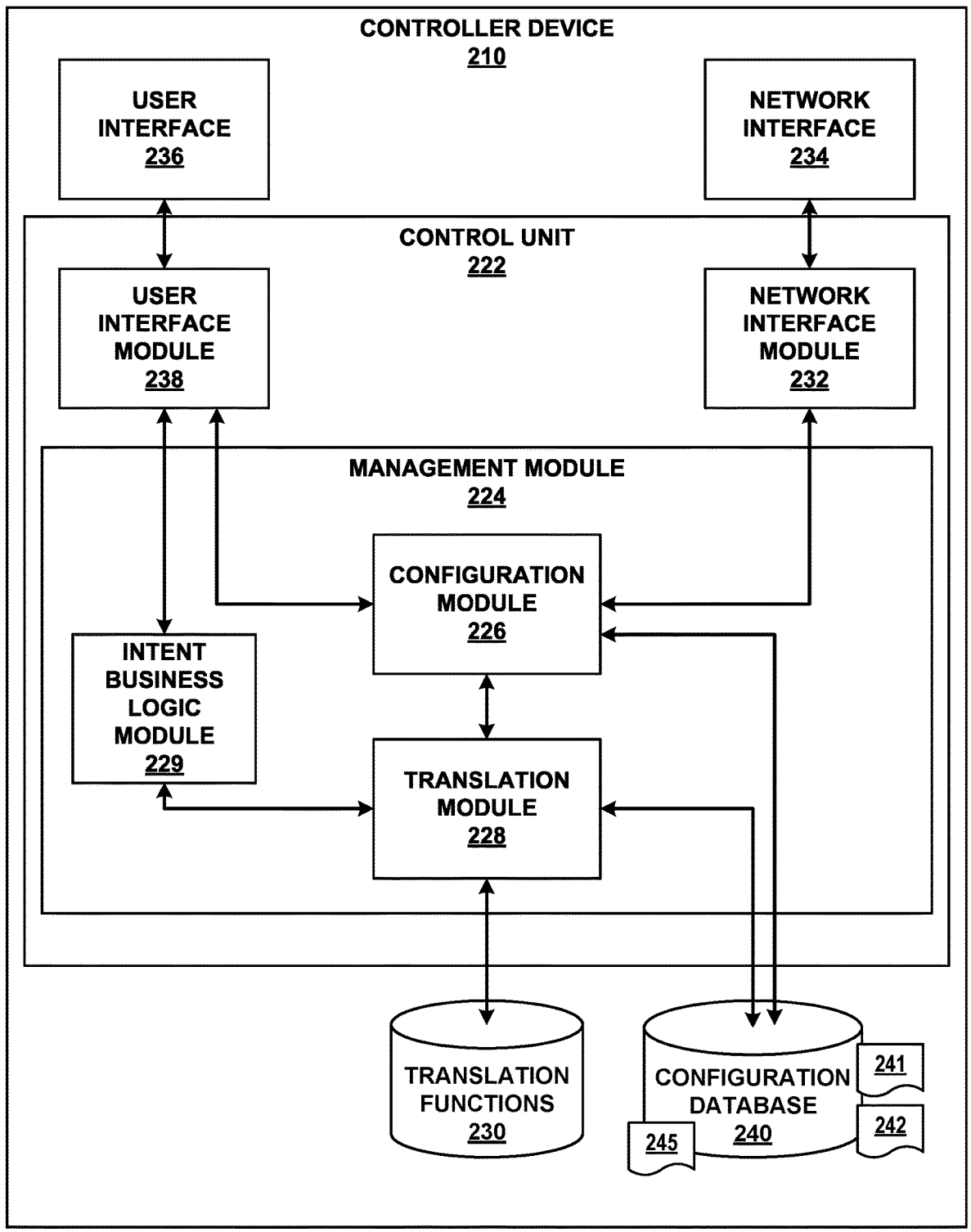
FIG. 2 is a block diagram illustrating an example controller, in accordance with one or more aspects of the present disclosure.

FIG. 2 is a block diagram illustrating an example controller, in accordance with one or more aspects of the present disclosure. Controller 210 of FIG. 2 may represent an example implementation of controller 110 of FIG. 1A and/or FIG. 1B. In the example of FIG. 2, controller 210 includes control unit 222, network interface 234, and user interface 236. Network interface 234 represents an example interface that can communicatively couple controller 110 to an external device, e.g., one of elements 121 of FIG. 1A. Network interface 234 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller 110 may include multiple network interfaces in various examples, although for ease of illustration, one network interface is illustrated in FIG. 2.

Control unit 222 represents any combination of hardware, software, and/or firmware for implementing the functionality attributed to control unit 222 and its constituent modules and elements. When control unit 222 includes software or firmware, control unit 222 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 236 represents one or more interfaces by which a user, such as administrator 127 (see FIG. 1A or FIG. 1B) interacts with controller 110, e.g., to provide input and receive output. For example, user interface 236 may represent one or more of a monitor, keyboard, mouse, touchscreen, touchpad, trackpad, speakers, camera, microphone, or the like. Furthermore, although in the example shown controller 110 includes user interface 236, administrators 127 or other users might not directly interact with controller 110, but instead may access controller 110 remotely (e.g., via administrator device 125 through network interface 234).

In the example of FIG. 2, control unit 222 includes user interface module 238, network interface module 232, and management module 224. Control unit 222 executes user interface module 238 to receive input from and/or provide output to user interface 236. Control unit 222 also executes network interface module 232 to send and receive data (e.g., packets) via network interface 234. User interface module 238, network interface module 232, and management module 224 may be implemented as respective hardware units, or in software or firmware, or a combination thereof.

Functionality of control unit 222 may be implemented as one or more processing units in fixed or programmable digital logic circuitry. Such digital logic circuitry may include one or more microprocessors, digital signal processors (DSPs), application specific integrated circuits (ASICs), field programmable gate arrays (FPGAs), or any other equivalent integrated or discrete logic circuitry, as well as any combination of such components. When implemented as programmable logic circuitry, control unit 222 may further include one or more computer readable storage media storing hardware or firmware instructions to be executed by processing unit(s) of control unit 222.

Control unit 222 executes management module 224 to manage various network devices, e.g., elements 121 of FIG. 1A and FIG. 1B. Management of a network device includes, for example, configuring the network devices according to instructions received from a user (e.g., administrator 127 of FIG. 1A or FIG. 1B) and providing the user with the ability to submit instructions to configure the network devices. Management of a network device may include pushing an intent-based configuration to the network device. In the example of FIG. 2, management module 224 further includes configuration module 226 and translation module 228. Configuration module 226 and translation module 228 may perform functions relating to determining an intent-based configuration of a network and pushing the intent-based configuration to a network in the manner described herein, such as in connection with FIG. 3. Translation module 228 may use one or more of translation functions 230 to perform such tasks. Translation module 228 may also employ intent business logic, embodied within intent business logic module 229, to assist in determining an intent-based configuration of a network.

Controller 110 also includes configuration database 240, which may include information describing managed network devices (e.g., elements 121). Configuration database 240 may act as an intent data store, which may be used to persist and manage collection of intent data models (e.g., including intent-based configuration 245). For example, configuration database 240 may include information indicating device identifiers (such as MAC and/or IP addresses), device type, device vendor, devices species (e.g., router, switch, bridge, hub, etc.), or the like. Configuration database 240 may also store configuration information (e.g., intent data model, or in some cases, both intent data model and low-level configuration information) for one or more of elements 121. Further, configuration database 240 may also store operational state information, including initial operational state 241 and post-migration operational state 242, as further described in connection with FIG. 3.

Modules illustrated in FIG. 2 (e.g., configuration module 226, translation module 228, user interface module 238, network interface module 232) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
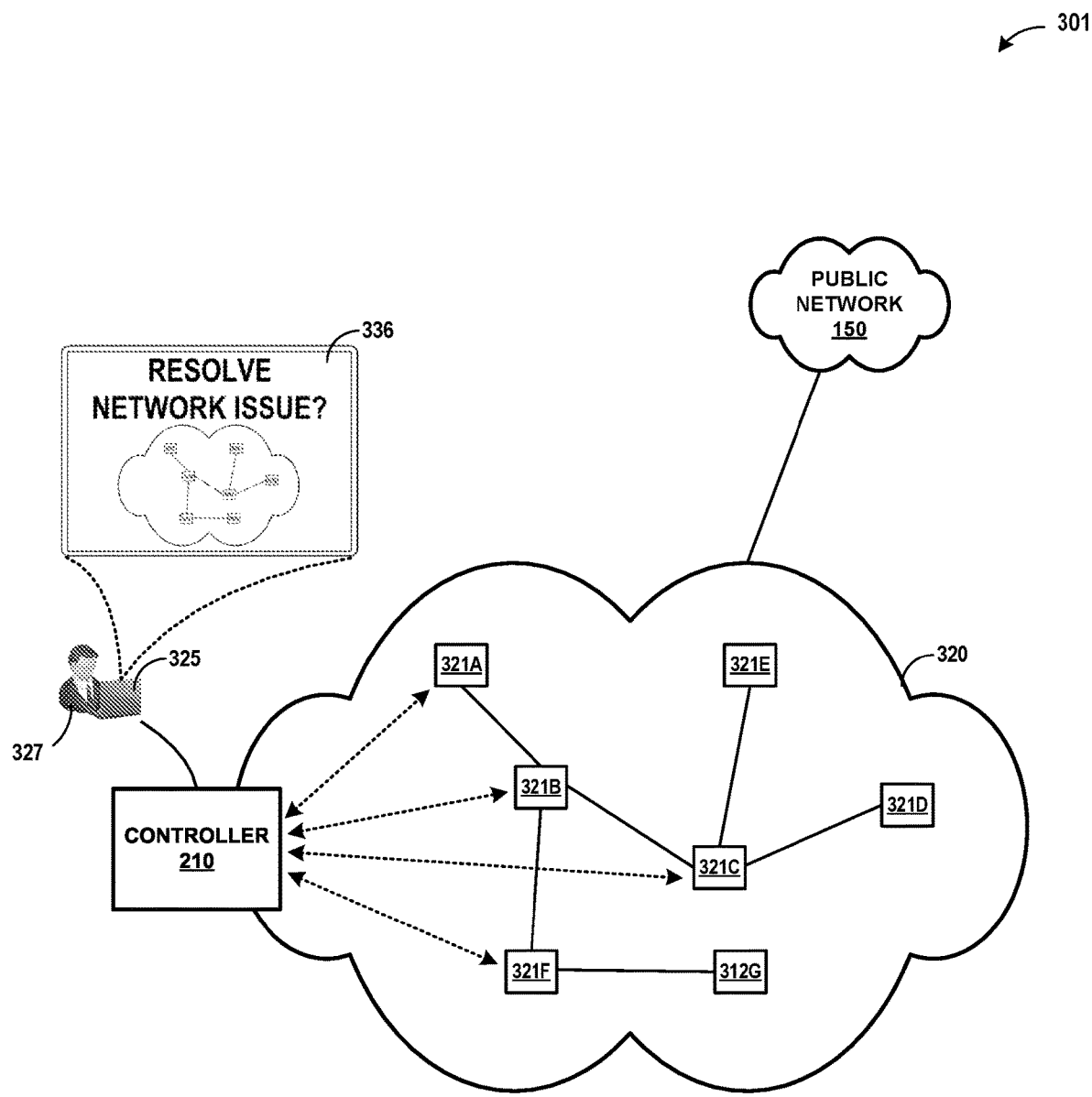
FIG. 3 is a conceptual diagram illustrating a network system being transitioned to a managed network system using an example controller, in accordance with one or more aspects of the present disclosure.

FIG. 3 is a conceptual diagram illustrating a network system being transitioned to a managed network system using an example controller, in accordance with one or more aspects of the present disclosure. The network illustrated in FIG. 3 is similar to managed network system 101A of FIG. 1A, and illustrates controller 210 (which may correspond to controller 210 of FIG. 2) being deployed within an existing fabric 320. Fabric 320 of FIG. 3 might represent a functional enterprise network, such as an EVPN VxLAN fabric, that serves an organization as an enterprise network that has historically been operated without any fabric management tool or controller. For any of a number of reasons, the organization that operates or controls fabric 320 may decide to deploy a fabric management tool (e.g., controller 210) within fabric 320. FIG. 3 thus represents a brownfield deployment of controller 210 into an organization's existing data center.

Included within network system 301 of FIG. 3 is fabric 320, public network 150, controller 210, and administrator device 325. Fabric 320 includes elements 321A through 321G (collectively "elements 321" and representing any number of elements). Such elements 321 may be similar to elements 121 of FIG. 1A and FIG. 1B. Public network 150 may correspond to public network 150 of FIG. 1A and FIG. 1B. Controller 210 may be implemented in the manner illustrated in FIG. 2. Administrator device 325 may be operated by one or more administrators, including, for example administrator 327. Administrator device 325 may present one or more user interfaces 336.

In accordance with one or more aspects of the present disclosure, controller 210 may be inserted into fabric 320. For instance, in an example that can be described in the context of FIG. 3, one or more network administrators (e.g., user interface 336) may physically connect controller 210 to fabric 320 as part of transitioning fabric 320 from a controllerless configuration to a managed configuration. Controller 210 may be physically connected through ports of various network devices, switches, and/or routers within fabric 320. Controller 210 is connected so that it is capable of communicating with each of elements 321 over fabric 320.

In some examples, adding controller 210 to fabric 320 may involve, as described, physically connecting one or more ports of controller 210 to switches, routers, or other network devices within fabric 320. In other examples, however, adding controller 210 to fabric 320 may be performed through software, with little or no physical intervention. For instance, controller 210 may be implemented as a virtual computing device, such as a container or virtual machine within fabric 320. In such an example, implementing controller 210 may involve spinning up and/or configuring one or more virtual execution entities on compute nodes within fabric 320 (or elsewhere, such as in a cloud data center) to perform the functions of controller 210.

Once controller 210 is capable of communicating with each of elements 321 and other network devices within fabric 320, controller 210 may establish communications with elements 321. For instance, continuing with the example being described with reference to FIG. 3, controller 210 outputs signals over fabric 320 to enable and initiate communications with each of elements 321. Controller 210 verifies that it can communicate with each of elements 321. Controller 210 also verifies that it can both query and modify various configuration settings of each of elements 321. Accordingly, once connected, controller 210 is able to output commands, queries, or other communications to each of elements 321 over fabric 320, and also receive responses to such commands, queries, or other communications. In general, controller 210 operates with complete device management control over fabric 320 and elements within fabric 320, because this ensures the ability to roll back or restore device settings in the event of a failure during migration of fabric 320 to a network managed by controller 210. In some examples, controller 210 may need to restore one or more elements 321 back to its original, pre-migration state.

Once established within fabric 320, controller 210 may respond to a command to begin migrating fabric 320 to a network managed by controller 210. For instance, in an example that can be described in the context of FIG. 2 and FIG. 3, user interface module 238 of controller 210 detects interaction with user interface 236. User interface module 238 determines that the interactions correspond to a request (e.g., caused by administrator 327 interacting with user interface 236 or administrator device 325) to integrate controller 210 within fabric 320 as a fabric management tool. In some examples, fabric 320 may be a functional network that does not use a fabric management tool and/or a controller. In other examples, fabric 320 might be a functional network that uses a fabric management tool or controller offered by a different vendor. In either case, and in the example being described, administrator 327 (or the organization that controls fabric 320) seeks to use controller 210 as a fabric management tool to manage fabric 320. Accordingly, controller 210 is being introduced into fabric 320 for the first time, or is replacing some other controller. Responsive to the request to integrate controller 210 within fabric 320, user interface module 238 outputs information to configuration module 226. Based on the information, configuration module 226 generates a series of operational commands that can be used to determine the current operational state of fabric 320.

Controller 210 may collect information about the operational state of fabric 320. For instance, continuing with the example being described in the context of FIG. 2 and FIG. 3, configuration module 226 outputs information about the series of operational commands to network interface module 232. Network interface module 232 causes network interface 234 to output a series of signals over fabric 320. Each of elements 321 within fabric 320 detect one or more of the signals. Each of elements 321 interpret such signals as operational commands or queries about its operational state. Each of elements 321 respond to the signals by outputting, to controller 210 over fabric 320, information about its respective operational state. Network interface 234 detects signals from elements 321 and outputs information about the signals to network interface module 232. Network interface module 232 outputs an indication of the signals to configuration module 226. Configuration module 226 determines that the signals are responsive to the series of operational commands issued to elements 321. Configuration module 226 interprets the responses to the operational commands, indexes the fields that relevant and/or important to the operational state of fabric 320, and uses that information to determine the operational state of each of fabric 320 and elements 321. Configuration module 226 stores initial operational state 241, reflecting the operational state of fabric 320 and each of elements 321. Accordingly, initial operational state 241 may represent the operational state of fabric 320 prior to deployment of controller 210.

As part of determining information about the operational state of fabric 320, controller 210 may collect information about both the underlay and overlay operational state. Capturing both the underlay and overlay operational state may be necessary to enable fabric 320 to operate in the same manner as the previously configured controllerless version of fabric 320. To collect the underlay and overlay operational state, controller 210 may query aspects of fabric 320 to collect information needed to replicate both the underlay and overlay operational state of fabric 320 so that both the underlay and overlay can be managed by controller 210. To obtain the underlay and overlay operational states, information can be collected through an appropriate method, such as through commands issued to a controller through a command line interface. In the example being described in the context of FIG. 2 and FIG. 3, fabric 320 may initially be a controller-less EVPN VxLAN fabric. For an EVPN VxLAN fabric, collecting information about the underlay and overlay may involve collecting information about the underlay eBGP and the EVPN VxLAN overlay.

Accordingly, controller 210 may collect information about the underlay operational state. For instance, in one specific example, the underlay operational state can be obtained through a series of Junos "show" commands. Although illustrated in the context of Junos, the commands for obtaining the operational state of fabric 320 and elements 321 tend to be independent of device models and family, even if the configuration might be specific to a particular hardware device, manufacturer, or family of devices. Junos commands illustrated in Table 1, below, illustrate information that can be used to identify the underlay operational state of fabric 320. Translation module 228 derives the logical entities in the right-most column in Table 1 from the values in the middle column to determine the intent-based configuration. The values in the middle column of Table 1 are the outputs received responsive to a command in the left-most column. The commands in the left-most column of Table 1 are a representative sample of pertinent operational commands for an example fabric 320.

TABLE 1

| Junos command | Desired Values | Logical Entity in the Controller |
|---|---|---|
| show lldp neighbors | Local Interface : ge-0/0/6<br>System name : TOR1-s3bu-tme-ex4300-6.juniper.net | Switches, Interfaces |
| show interfaces extensive | Physical interface: et-0/0/0<br>Local: 10.80.224.8/31<br>Physical interface: lo0<br>Local: 10.80.224.149 | Switches, Interfaces, fabric-link IPs, loopback IPs |
| show bgp neighbor | Peer: 10.80.224.2+57138 AS 10021<br>Local: 10.80.224.3+179 AS 65012 | Switches, underlay ASNs |
| show bgp group detail | show bgp group detail<br>Group Type: External Local AS: 65019<br>Name: UNDERLAY Index: 1 Flags: <><br>Export: [ FROM__Lo0<br>FROM__UNDERLAY__BGP ]<br>Options: <LocalAS><br>Options: <GracefulShutdownRcv><br>Holdtime: 0<br>Graceful Shutdown Receiver local-preference: 0<br>Local AS: 65019 Local System AS: 64830<br>Total peers: 2 Established: 2<br>172.16.0.0+179<br>172.16.0.6+52083<br>Route Queue Timer: unset Route Queue: empty<br>Table inet.0<br>Active prefixes: 5<br>Received prefixes: 5<br>Accepted prefixes: 5<br>Suppressed due to damping: 0<br>Advertised prefixes: 1 | Information about underlay policy |

TABLE 1-continued

| Junos command | Desired Values | Logical Entity in the Controller |
|---|---|---|
| show bfd session extensive | Address State Interface Time Interval Multiplier<br>10.80.224.2 Up et-0/0/49.0 1.050 0.350 3 | BFD timers |
| show policy <policy name> | show policy FROM_Lo0<br>Policy FROM_Lo0:<br>Term 10:<br>from interface lo0.0<br>then accept<br>Term 20:<br>from interface irb.999<br>then accept<br>Term 30:<br>then reject | Underlay BGP policy |

Controller 210 may also collect information about the overlay operational state. For instance, in a manner similar to that described in connection with the underlay operational state, the overlay operational state can also be obtained through a series of Junos "show" commands. Again, although illustrated in the context of Junos, the commands for obtaining the operational state of fabric 320 and elements 321 tend to be independent of device models and family, even if the configuration might be specific to a particular hardware device, manufacturer, or family of devices. Junos commands illustrated in Table 2, below, illustrate information that can be used to identify the overlay operational state of fabric 320. As with Table 1, translation module 228 derives the logical entities in the right-most column in Table 2 from the values in the middle column to determine the intent-based configuration. The values in the middle column are outputs generated in response to the commands listed in the left-most column.

TABLE 2

| Junos command | Desired Values | Logical Entity in the Controller |
|---|---|---|
| show vlans extensive | Routing instance: default-switch<br>VLAN Name: v111 State: Active<br>Tag: 111<br>Internal index: 14,<br>Generation Index: 14,<br>Origin: Static<br>MAC aging time: 600 seconds<br>Layer 3 interface: irb.111<br>VXLAN Enabled : Yes<br>Interfaces:<br>ae1.0,tagged,trunk<br>ae2.0,tagged,trunk<br>Number of interfaces:<br>Tagged 2 , Untagged 0<br>Total MAC count: 0 | Virtual port groups, Interfaces, Vlan ID |
| show interfaces terse \| match irb | irb up up<br>irb.110 up up inet 10.1.110.1/24<br>irb.111 up up inet 10.1.111.1/24<br>irb.112 up up inet 10.1.112.1/24 | Virtual port group , Networks , VRFs , irb ips |
| show evpn instance extensive | Number of IRB interfaces: 3 (3 up)<br>Interface name VLAN VNI Status L3 context<br>irb.110 110 Up V110_VRF<br>irb.111 111 Up V111_VRF<br>irb.112 112 Up V112_VRF" | Network and VxLAN ID |
| show interfaces extensive | Logical interface ae1.0 (Index 558) (SNMP ifIndex 563) (Generation 180)<br>Flags: Device-Down SNMP-Traps CCC-Down 0x24024000<br>Encapsulation: Ethernet-Bridge<br>Statistics Packets pps Bytes bps | Virtual port group |

TABLE 2-continued

| Junos command | Desired Values | Logical Entity in the Controller |
|---|---|---|
| | Bundle:<br>Input : 0 0 0 0<br>Output: 1038 0 101132 0<br>Adaptive Statistics:<br>Adaptive Adjusts: 0<br>Adaptive Scans : 0<br>Adaptive Updates: 0<br>Protocol eth-switch, MTU:<br>9200, Generation: 205,<br>Route table: 10, Mesh<br>Group: __all_ces__,<br>EVPN multi-homed status:<br>Blocking BUM Traffic to<br>ESI, EVPN multi-homed<br>ESI Split Horizon Label:<br>0, Next-hop: 1779, vpls-<br>status: up<br>Flags: Trunk-Mode<br>Input Filters: Intf_Filter | |
| show route instance extensive | Type: vrf State: Active<br>Interfaces:<br>irb.110<br>lsi.256<br>lo0.110"<br>Route-distinguisher:<br>10.80.224.140:9110<br>Vrf-import: [ __vrf-<br>import-V110_VRF-<br>internal__ ]<br>Vrf-export: [ __vrf-export-<br>V110_VRF-internal__ ]<br>Vrf-import-target: [<br>target: 64730:110 ]<br>Vrf-export-target: [<br>target: 64730:110 ]" | VRF |
| show firewall | show firewall<br>Filter: pvlanfilter | Firewall filters |
| show bgp neighbor | show firewall<br>Filter: pvlanfilter | ASNs, VTEP IPs |
| show bfd session extensive | Address State Interface<br>Detect Time Transmit<br>Interval Multiplier<br>10.80.224.2 Up et-0/0/49.0<br>1.050 0.350 3 | BFD timers |
| show evpn l3-context | show evpn l3-context<br>V110_VRF extensive<br>L3 context: V110_VRF<br>Type: Configured<br>Advertisement mode:<br>Direct nexthop, Router<br>MAC: f0:4b:3a:b9:80:a0<br>Encapsulation: VXLAN,<br>VNI: 9110<br>IPv4 source VTEP<br>address: 10.80.224.143<br>IP–>EVPN export policy:<br>T5_EXPORT<br>Flags: 0xd <Configured<br>Sys-MAC IRB-MAC><br>Change flags: 0x0<br>Composite nexthop<br>support: Enabled<br>Route Distinguisher:<br>10.80.224.143:9110<br>Reference count: 27 | |
| show policy <policy name> | show policy T5_EXPORT<br>Policy T5_EXPORT:<br>Term fm_direct:<br>from proto Direct<br>then accept<br>Term fm_static:<br>from proto Static<br>then accept<br>Term fm_v4_host:<br>from proto EVPN<br>route filter:<br>0.0.0.0/0 prefix-length-<br>range /32-/32 | Type 5 export policies |

TABLE 2-continued

| Junos command | Desired Values | Logical Entity in the Controller |
|---|---|---|
| | then accept<br>Term fm_v6_host:<br>from proto EVPN<br>route filter:<br>::/0 prefix-length-range<br>/128-/128<br>then accept | |

Submitted as part of this disclosure as an Appendix is a listing of the information generated by an example network (e.g., similar to fabric 320) in response to various operational commands. In some respects, the information included in the Appendix represents a more complete listing than that of Tables 1 and 2. In the Appendix, Junos "show" command examples are used, and example responses to such commands are provided. The Appendix details example responses to operational commands issued to two different Juniper Networks switches (models QFX10000 and QFX5000) available from Juniper Networks of Sunnyvale, Calif.

Controller 210 may translate the information about the operational state of fabric 320 into intent-based configuration 245. For instance, still continuing with the example being described in the context of FIG. 2 and FIG. 3, configuration module 226 outputs information about the operational state of fabric 320 and elements 321 to translation module 228. Such operational state information may correspond to initial operational state 241, and may include information about both underlay and overlay operational state, as described above. Translation module 228 translates the information about the operational state of each of elements 321 into one or more objects that define an intent-based configuration. To perform the translation of initial operational state 241 to intent-based configuration 245, translation module 228 may access one or more translation functions 230 (i.e., included within controller 210 or accessible to controller 210). Generally, translation module 228 is designed to know that particular operational command outputs translate into specific database objects used to define an intent-based configuration. For example, translation module 228 might understand that information about enumerated VLANs in the network should be mapped to corresponding virtual network objects that can be used to determine an intent-based configuration. Translation module 228 stores, in configuration database 240, one or more database objects corresponding to the objects as intent-based configuration 245.

In some examples, when collecting information about the operational state of fabric 320, controller 210 may encounter one or more network issues when attempting to transition fabric 320 to a managed network using controller 210. For instance, again with reference to FIG. 2 and FIG. 3, network interface module 232 may cause network interface 234 to communicate or attempt to communicate with one or more elements 321 while collecting information about the operational state of fabric 320. Network interface 234 may receive signals in response to such communications, and output an indication of such signals to network interface module 232. Network interface module 232 may evaluate the indication of such signals and determine that one or more links within fabric 320 are down or inoperable, one or more elements 321 or peers of elements 321 are down or in operable, or other issues exist in fabric 320 that suggest that fabric 320 not in a stable state and is not running without significant errors or operability issues.

In such an example, network interface module 232 outputs information about the issues it encounters to configuration module 226. Configuration module 226 causes user interface module 238 to generate one or more user interfaces to administrator 327 at user interface 236 (or using administrator device 325, operated by administrator 327). Such user interfaces (e.g., shown as user interface 336 in FIG. 3) may prompt administrator 327 to either resolve the network issues or continue with the transition of fabric 320 to being managed by controller 210. In some examples, user interface 336 may include a representation of the topology of fabric 320 generated by controller 210 to aid administrator 327 in understanding and addressing the issues present in fabric 320. Once such issues are resolved or otherwise addressed, configuration module 226 of controller 210 continues the migration process.

In some examples, controller 210 may present multiple user interfaces 336 to administrator 327 at administrator device 325, presenting one or more issues each time, so that administrator 327 may respond to numerous issues during migration. In other examples, controller 210 may collect a list of all the issues to be addressed by administrator 327 and present the list to administrator 327 at one time through a series of user interfaces 336 at administrator device 325.

Once initial operational state 241 has been collected and intent-based configuration 245 has been determined, controller 210 may push intent-based configuration 245 to fabric 320. For instance, again referring to FIG. 2 and FIG. 3, configuration module 226 accesses information about intent-based configuration 245 in configuration database 240. Configuration module 226 outputs information about intent-based configuration 245 to network interface module 232, which causes network interface 234 to output a series of signals over fabric 320. Each of elements 321 detect signals and determine that the signals correspond to commands to configure or reconfigure its operation to reflect intent-based configuration 245. In some examples, for each of elements 321 to configure or reconfigure its operation, one or more of elements 321 may clear, overwrite, and/or modify existing configurations to appropriately reflect intent-based configuration 245. Also, in some examples, once each of elements 321 perform the requested configurations consistent with intent-based configuration 245, one or more of elements 321 may output signals over fabric 320 to confirm the new configuration. Network interface 234 of controller 210 detects such signals and outputs information about the signals to network interface module 232 and configuration module 226. Configuration module 226 determines that the signals correspond to confirmation by each of elements 321 that the requested configurations have been pushed to each of elements 321 and performed.

Controller 210 may determine whether the new operational state of fabric 320, after pushing intent-based configuration 245 to fabric 320, matches and/or is consistent with the configuration of fabric 320 prior to insertion of controller 210. For instance, again referring to FIG. 2 and FIG. 3, configuration module 226 generates a series of operational commands to determine the operational state of fabric 320 after intent-based configuration 245 has been pushed to fabric 320. Such commands may correspond to or may be similar to those commands used to determine initial operational state 241. Configuration module 226 outputs information about the operational commands to network interface module 232, which causes network interface 234 to output a series of signals over fabric 320. Each of elements 321 detect one or more of the signals and interpret such signals as operational commands. Each of elements 321 respond to the signals by outputting operational state information. Network interface 234 detects signals from elements 321 and outputs information about the signals to network interface module 232. Configuration module 226 determines that the information is responsive to the operational commands issued to each of elements 321. Configuration module 226 interprets the responses to the operational commands, and determines the new operational state of each of elements 321. Configuration module 226 may store information about new operational state as post-migration operational state 242. Configuration module 226 compares post-migration operational state 242 to initial operational state 241 to confirm that the operational state of fabric 320, after inserting controller 210 and configuring fabric 320 to be managed by controller 210, is the same as the operational state of fabric 320 prior to insertion of controller 210.

Controller 210 may present information about the migration. For instance, once again referring to FIG. 2 and FIG. 3, configuration module 226 may cause user interface module 238 to generate one or more user interfaces about the comparison of initial operational state 241 and post-migration operational state 242. Each of such user interfaces may be presented at administrator device 325 for evaluation by administrator 327. Such user interfaces may be similar to user interface 336. In some examples, initial operational state 241 and post-migration operational state 242 are identical or substantially identical, and thus such user interfaces simply report that no changes to the operational state of fabric 320 have been made as the result of the migration of fabric 320 to being managed by controller 210.

In other examples, initial operational state 241 and post-migration operational state 242 may differ in some respects, and a user interfaces generated by user interface module 238 may highlight ways in which initial operational state 241 and post-migration operational state 242 differ (e.g., by presenting a topology of fabric 320). In some cases, administrator 327 may determine that such differences are not important or significant. In other cases, however, administrator 327 may determine that such differences warrant remediation, which may involve some physical or other intervention with fabric 320 to address the issues that cause the differences between initial operational state 241 and post-migration operational state 242. After intervention, controller 210 may again initiate the migration process described above to generate a new post-migration operational state 242. Controller 210 and/or administrator 327 may determine whether the interventions resolved the issue by comparing the new post-migration operational state 242 to initial operational state 241.

Figure 4:
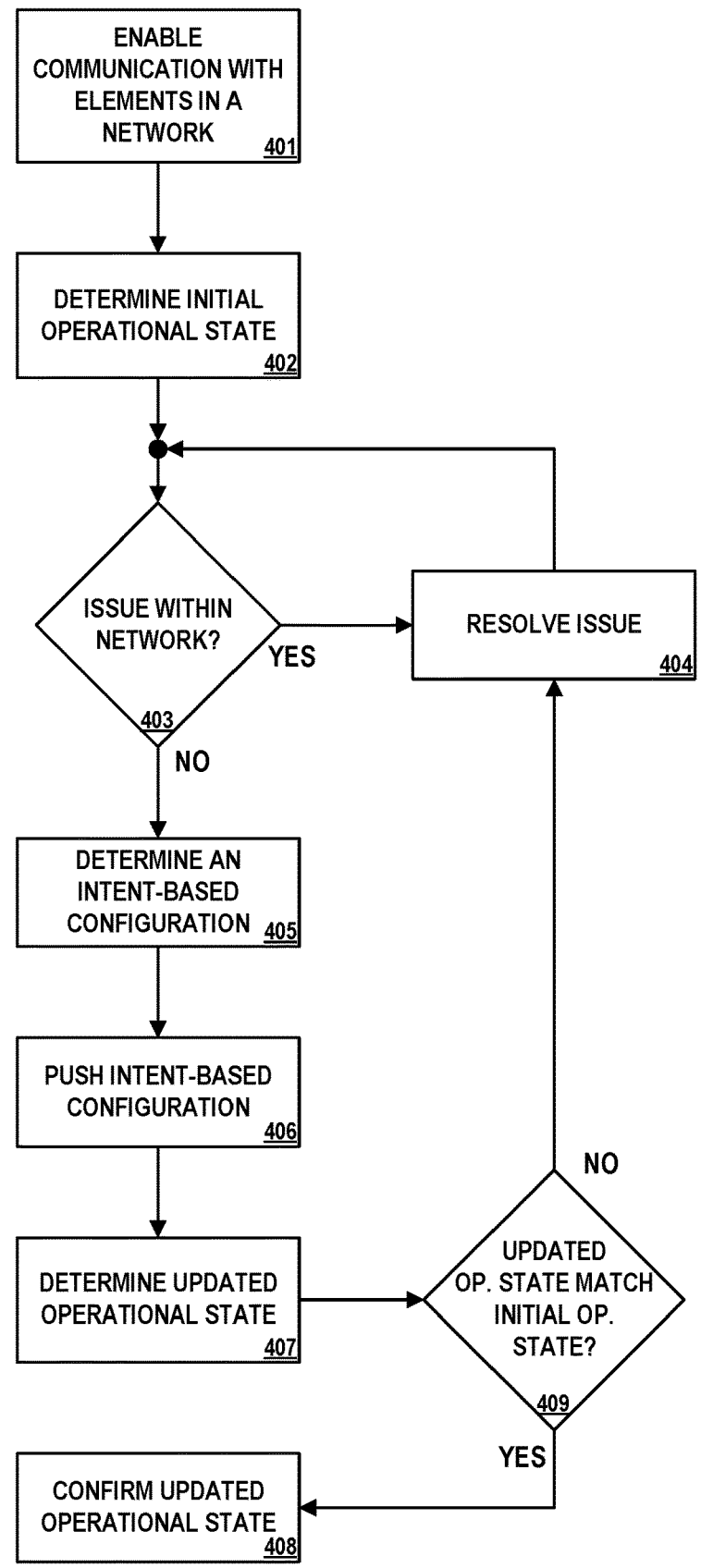
FIG. 4 is a flow diagram illustrating operations performed by an example controller in accordance with one or more aspects of the present disclosure.

FIG. 4 is a flow diagram illustrating operations performed by an example controller 210 in accordance with one or more aspects of the present disclosure. FIG. 4 is described below within the context of controller 210 of FIG. 2 and network system 301 of FIG. 3. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, controller 210 may enable communication with elements 321 of fabric 320 (401). For example, controller 210 may output signals over fabric 320 to enable and initiate communications with each of elements 321. Controller 210 may verify that it can communicate with each of elements 321. Controller 210 may also verify that it can both query and modify configuration settings for each of elements 321.

Controller 210 may determine an initial operational state of fabric 320 (402). For example, configuration module 226 may cause controller 210 to output a series of operational commands to elements 321 within fabric 320. Each of elements 321 within fabric 320 may detect one or more of the signals, and respond to the signals by outputting, to controller 210 over fabric 320, information about its respective operational state. Configuration module 226 of controller 210 may interpret the responses to the operational commands, and use that information to determine the operational state of fabric 320 and elements 321. Configuration module 226 may store the initial operational state within configuration database 240 (e.g., as 241).

Controller 210 may prompt an administrator to resolve any network issues (403). For example, controller 210 may determine that one or more links within fabric 320 are down or inoperable, one or more elements 321 or peers of elements 321 are down or in operable, or other issues exist in fabric 320 that suggest that fabric 320 not in a stable state and/or has operability issues. Controller 210 may output a signal to administrator device 325, which causes administrator device 325 to present user interface 336. Controller 210 may wait until the issue is resolved (404 and YES path from 403). Eventually, controller 210 determines, based on detected interactions with user interface 336 or otherwise, that the issue is no longer present (NO path from 403).

Controller 210 may determine an intent-based configuration (405). For example, translation module 228 of controller 210 translates the information about the operational state of fabric 320 and each of elements 321 into one or more objects that define an intent-based configuration. Translation module 228 stores, in configuration database 240, one or more database objects corresponding to the objects as intent-based configuration 245.

Controller 210 may push the intent-based configuration (406). For example, controller 210 may output a series of signals over fabric 320. Each of elements 321 may detect such signals and determine that the signals correspond to commands to configure or reconfigure its operation to reflect intent-based configuration 245. Each of elements 321 perform the configurations.

Controller 210 may determine an updated operational state of fabric 320 (407). For example, configuration module 226 causes controller 210 to again output a series of operational commands over fabric 320. Controller 210 receives responses to the commands and uses the responses to determine an updated operational state. Controller 210 may store information about new operational state as post-migration operational state 242.

Controller 210 may confirm the updated operational state (408). For example, module 226 compares post-migration operational state 242 to initial operational state 241. Configuration module 226 compares the operational state of fabric 320, after inserting controller 210 and configuring fabric 320 to be managed by controller 210, with the operational state of fabric 320 prior to insertion of controller 210 (409). Configuration module 226 confirms the operational state by verifying that operational state 242 sufficiently matches initial operational state 241 (YES path from 409). Should the updated operational state deviate from the initial operational state, controller 210 may prompt an administrator to either rollback the configuration or accept the deviation. In some examples, the administrator may resolve the issue through manual or other intervention (NO path from 409).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, a limited number of devices or systems (e.g., controller 110, fabric 120, elements 121, fabric 130, elements 131, administrator devices 125, as well as others) are shown within the illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system comprising processing circuitry configured to:
    collect information about an operational state of an existing network;
    determine, based on the collected information about the operational state of the network, an intent-based configuration associated with the network;
    reconfigure the network by pushing the intent-based configuration to network elements within the network; and
    confirm, after reconfiguring the network, that the network operates in a manner consistent with the intent-based configuration.

2. The computing system of claim 1, wherein to collect information about the operational state of the network, the processing circuitry is configured to:
    output operational commands to the network elements; and
    receive responses to the operational commands.

3. The computing system of claim 2, wherein to determine the intent-based configuration, the processing circuitry is configured to:
    translate the responses to the operational commands into an intent-based configuration.

4. The computing system of claim 3, wherein to translate the responses, the processing circuitry is further configured to:
    translate the responses into a plurality of intent-based network objects representing the operational state of the network.

5. The computing system of claim 3, wherein to translate the responses, the processing circuitry is further configured to:
    reverse engineer the operational state to determine a plurality of intent-based network objects representing the operational state of the network.

6. The computing system of claim 4, wherein to reconfigure the network, the processing circuitry is configured to:
    determine, based on the intent-based network objects, commands for configuring the network elements; and
    output, over the network, the commands to configure each of the network elements in the network.

7. The computing system of claim 2, wherein to output the operational commands, the processing circuitry is further configured to:
    output operational commands that elicit information about underlay configurations associated with the network.

8. The computing system of claim 2, wherein to output the operational commands, the processing circuitry is further configured to:
    output operational commands that elicit information about overlay configurations associated with the network.

9. The computing system of claim 1, wherein to reconfigure the network, the processing circuitry is further configured to:
    overwrite device-level configurations for at least some of the network elements.

10. The computing system of claim 1, wherein to reconfigure the network, the processing circuitry is configured to:
    convert the network elements from unmanaged network elements to managed network elements.

11. The computing system of claim 1, wherein to reconfigure the network, the processing circuitry is configured to:
    generate a user interface that includes information about the intent-based configuration for the network.

12. The computing system of claim 11, wherein to reconfigure the network, the processing circuitry is further configured to:
    output the user interface;
    receive an indication of input confirming the intent-based configuration for the network; and
    responsive to the indication, reconfigure the network.

13. The computing system of claim 1, wherein to confirm that the network operates in a manner consistent with the intent-based configuration, the processing circuitry is configured to:
    determine, after reconfiguring the network by pushing the intent-based configuration, an updated operational state of the network; and
    compare the operational state of the network with the updated operational state of the network.

14. The computing system of claim 13, wherein to confirm that the network operates in a manner consistent with the intent-based configuration, the processing circuitry is further configured to:
    determine that the updated operational state of the network is not consistent with the operational state of the network; and output a user interface presenting information about differences between the operational state of the network and the updated operational state of the network.

15. The computing system of claim 1, wherein to collect information about the operational state of the network, the processing circuitry is configured to:
deploy a fabric manager in the network; and
enable the fabric manager to communicate with the network elements.

16. A method comprising:
collecting, by a computing system, information about an operational state of an existing network;
determining, by the computing system and based on the collected information about the operational state of the network, an intent-based configuration associated with the network;
reconfiguring the network, by the computing system, by pushing the intent-based configuration to network elements within the network; and
confirming, by the computing system and after reconfiguring the network, that the network operates in a manner consistent with the intent-based configuration.

17. The method of claim 16, wherein collecting information about the operational state of the network includes:
outputting, to the network elements, operational commands; and
receiving responses to the operational commands.

18. The method of claim 17, wherein determining the intent-based configuration includes:
translating the responses to the operational commands into an intent-based configuration.

19. The method of claim 18, wherein translating the responses includes:
translating the responses into a plurality of intent-based network objects representing the operational state of the network.

20. A non-transitory computer-readable medium comprising instructions that, when executed, cause processing circuitry of a computing system to:
collect information about an operational state of an existing network;
determine, based on the collected information about the operational state of the network, an intent-based configuration associated with the network;
reconfigure the network by pushing the intent-based configuration to network elements within the network; and
confirm, after reconfiguring the network, that the network operates in a manner consistent with the intent-based configuration.

\* \* \* \* \*